(12) United States Patent
Tang et al.

(10) Patent No.: US 12,044,085 B1
(45) Date of Patent: Jul. 23, 2024

(54) INTEGRATED MULTI-SLIP SIDETRACKING SETTING DEVICE FOR ULTRA-DEEP WELL

(71) Applicant: Ming Tang, Chengdu (CN)

(72) Inventors: Ming Tang, Chengdu (CN); Shuangning Wang, Chengdu (CN); Yadong Jing, Chengdu (CN); Shiming He, Chengdu (CN); Yuemiao Zhou, Chengdu (CN)

(73) Assignee: Ming Tang, Chengdu (CN)

( * ) Notice: Subject to any disclaimer, the term of this patent is extended or adjusted under 35 U.S.C. 154(b) by 0 days.

(21) Appl. No.: 18/633,020

(22) Filed: Apr. 11, 2024

(30) Foreign Application Priority Data

Apr. 17, 2023 (CN) .......................... 202310402812.8

(51) Int. Cl.
*E21B 23/01* (2006.01)
*E21B 7/06* (2006.01)

(52) U.S. Cl.
CPC ................ *E21B 23/01* (2013.01); *E21B 7/06* (2013.01)

(58) Field of Classification Search
CPC . E21B 29/06; E21B 7/06; E21B 23/01; E21B 23/02
See application file for complete search history.

(56) References Cited

FOREIGN PATENT DOCUMENTS

| CN | 2172342 Y | 7/1994 |
|---|---|---|
| CN | 113123745 A | 7/2021 |

*Primary Examiner* — Dany E Akakpo
(74) *Attorney, Agent, or Firm* — Birchwood IP

(57) ABSTRACT

An integrated multi-slip sidetracking setting device for an ultra-deep well, the central shaft is arranged above the pressing plate and supported by the pressing plate, and the pressing plate is supported by the stable base below and can move up and down, so that the central shaft and the pressing plate can synchronously move up and down; the slip can radially extend out of the side surface of the housing of the setting device under the driving of the central shaft coaxially arranged in the setting device, when the central shaft is fixed, the slip sheet is positioned outside the housing, the adjusting plate is arranged below the pressing plate. The internal structure of the present invention has lower complexity, higher robustness and greater setting force, thereby reducing the slippage risk of the setting device used for window sidetracking during the window sidetracking process.

3 Claims, 9 Drawing Sheets

INTEGRATED MULTI-SLIP SIDETRACKING SETTING DEVICE FOR ULTRA-DEEP WELL

CROSS-REFERENCE TO RELATED APPLICATIONS

This application claims priority to Chinese Patent Application No. 202310402812.8, filed on Apr. 17, 2023, which is hereby incorporated by reference in its entirety.

TECHNICAL FIELD

The present invention relates to the technical field of petroleum development equipment, and specifically to an integrated multi-slip sidetracking setting device for an ultra-deep well.

BACKGROUND

In a process of developing deep and ultra-deep oil and gas resources, to reduce cost and improve production efficiency, a window sidetracking method is often adopted. However, the casing steel grade is high and the wall is thick at ultra-deep well sections, and tools are used in a high-temperature and high-pressure environment, which makes it difficult for high success rate and quality of windowing. After one-time setting releasing, in the window sidetracking process, under the influence of various factors such as the drilling pressure and cutting torque applied by a drill bit to the setting device as well as mechanical vibration, the sidetracking setting device for the ultra-deep well currently used has the risk of loosened setting, resulting in slippage and falling. Once slippage occurs, a borehole trajectory cannot be achieved according to a designed trajectory, and it is even impossible to continue to complete the window sidetracking operation. Therefore, at present, there is an urgent need for an integrated multi-slip sidetracking setting device for an ultra-deep well, which can be used in cooperation with directional drill pipes to achieve successful sidetracking in ultra-deep wells and solve problems such as unstable setting, difficult working and poor windowing quality in ultra-deep well sections.

SUMMARY

In view of this, the present invention aims to provide an integrated multi-slip sidetracking setting device for an ultra-deep well, which is used in cooperation with directional drill pipes to achieve successful sidetracking in ultra-deep wells and solve problems such as unstable setting, difficult working and poor windowing quality in ultra-deep well sections.

To solve at least one of the above technical problems, the present invention provides technical solutions as follows.

Provided is an integrated multi-slip sidetracking setting device for an ultra-deep well, which comprises a housing, a bottom cover and a setting device body. The setting device body is of a cylindrical structure with an upper part being an inclined plane, a surface of the setting device body is covered with the housing, the detachable bottom cover covers the bottom of the setting device body, a central shaft, a plurality of groups of slips, a stable base, an adjusting plate, a pressing plate and a locking block are arranged inside the setting device, wherein one of the slips comprises a slip body and a slip sheet, the slip sheet is an arc body, a radian of the slip sheet is the same as that of a front side surface of the housing of the setting device, and the slip body is connected and arranged on an inner concave surface of the slip sheet; the central shaft is arranged above the pressing plate and supported by the pressing plate, and the pressing plate is supported by the stable base below and can move up and down, so that the central shaft and the pressing plate can synchronously move up and down; the slip can radially extend out of the side surface of the housing of the setting device under the driving of a central shaft coaxially arranged in the setting device, a through hole with the same radian and shape as the slip sheet is correspondingly arranged on the side surface of the housing and used to allow the slip sheet to pass through, and when the central shaft is fixed, the slip sheet is positioned outside the housing; and the adjusting plate is arranged below the pressing plate, and when the central shaft pushes the pressing plate to move downward, the pressing plate can push the adjusting plate to move upward and allows the locking block to cooperate with a locking groove on a surface of the central shaft to fix the central shaft.

In one embodiment of the present invention, the slip is arranged on a slip support, wherein the slip support is arranged inside the housing and cooperates with the slip through a sliding groove to allow the slip to move while supporting the slip.

In one embodiment of the present invention, a plurality of groups of fixed teeth are arranged at intervals on a convex surface of the slip sheet.

In one embodiment of the present invention, the surface of the central shaft is provided with racks in one-to-one correspondence with slips in number and position along the axial direction.

Further, the central shaft is connected to the slip through a transmission gear, wherein the transmission gear comprises a gear, transmission wheels and connecting shafts, the gear is supported by a gear strut arranged inside the setting device and engaged with the rack, and can be driven by the rack to rotate around the axis, a connecting rod is arranged at the axis of the gear and connected to a plurality of groups of transmission wheels, the transmission wheels are connected side by side through side surfaces of the connecting shafts, and axes of the adjacent transmission wheels are not overlapped, so that rotating shafts of all the transmission wheels are parallel to a rotating shaft of the gear, and the transmission wheels can contact the slip and drive the slip to move.

Further, the slip body is provided with transmission grooves corresponding to the transmission wheels in number, the transmission wheels can contact the transmission grooves to push the slip body and slip sheet to move along a direction perpendicular to a plane where the rotating shafts of the transmission wheels are positioned, and all the transmission wheels cannot contact the transmission grooves simultaneously.

In one embodiment of the present invention, the stable base is provided with a lifting base, a lifting component capable of moving horizontally is arranged in the lifting base, the lifting component can be pushed to move horizontally when the pressing plate moves up and down, and the lifting component moving horizontally can drive the adjusting plate to move up and down.

Further, the adjusting plate comprises an adjusting support rod and an adjusting support plate, the adjusting support rod is arranged in the middle of the adjusting plate, the adjusting support plate surrounds the adjusting support rod and is arranged on the adjusting plate, the adjusting support rod penetrates through the lifting base and is clamped on a top surface of the lifting base, the adjusting support rod further supports the pressing plate through a support spring, and at least a part of inclined section of the lifting component penetrates through the adjusting support rod, so that when the lifting component moves horizontally, the adjusting support rod can move up and down along the inclined section, and meanwhile the adjusting support plate is driven to move synchronously. The adjusting support plate is further provided with a connecting hole, and when the central shaft moves to a to-be-fixed position, the connecting hole moves to the locking block, and the locking block is allowed to penetrate through the connecting hole to cooperate with the locking groove to fix the central shaft.

In one embodiment of the present invention, an inner side wall of the housing is also provided with a snap ring that allows the central shaft to pass through smoothly, and the locking block can move horizontally on the snap ring.

In one embodiment of the present invention, the locking block and the locking groove are both made of magnetic materials.

The present invention has the technical effects as follows.

According to the present invention, the locking block and the central shaft are connected and fixed by magnetic adsorption, so that the complexity of the internal structure of this tool is reduced, the overall robustness of the device is improved, and the number of slips can be increased. The slips in the present invention are staggered into the inner wall of the casing, which increases the engagement strength between the slips and the external casing. Compared with the slip mechanism of the existing setting device, the transmission mechanism used by the slips of the present invention mainly comprises a gear rack and a transmission gear with an eccentric transmission wheel structure, and the staggering between the inclined slip and the casing is more stable and smooth compared with the opening mode of the slip of the existing setting device, so that the setting force is increased, and the slippage risk of the setting device used for window sidetracking during the window sidetracking process is reduced.

BRIEF DESCRIPTION OF THE DRAWINGS

To describe the technical solutions in embodiments of the present invention more clearly, the following briefly describes the accompanying drawings used for describing embodiments. It should be understood that the accompanying drawings show only some embodiments of the present invention, and therefore should not be considered as a limitation on the scope. Those of ordinary skill in the art may still derive other related drawings from these accompanying drawings without creative efforts.

Figure 1:
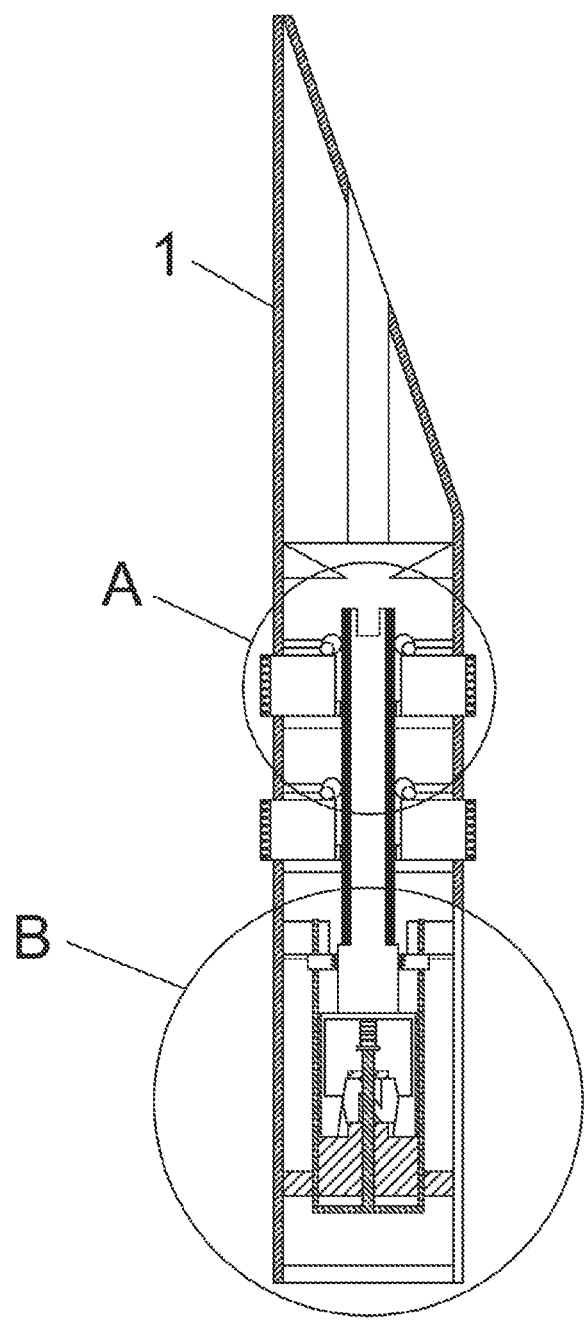
FIG. 1 is a schematic diagram of an overall structure of a setting device according to the present invention.
Figure 2:
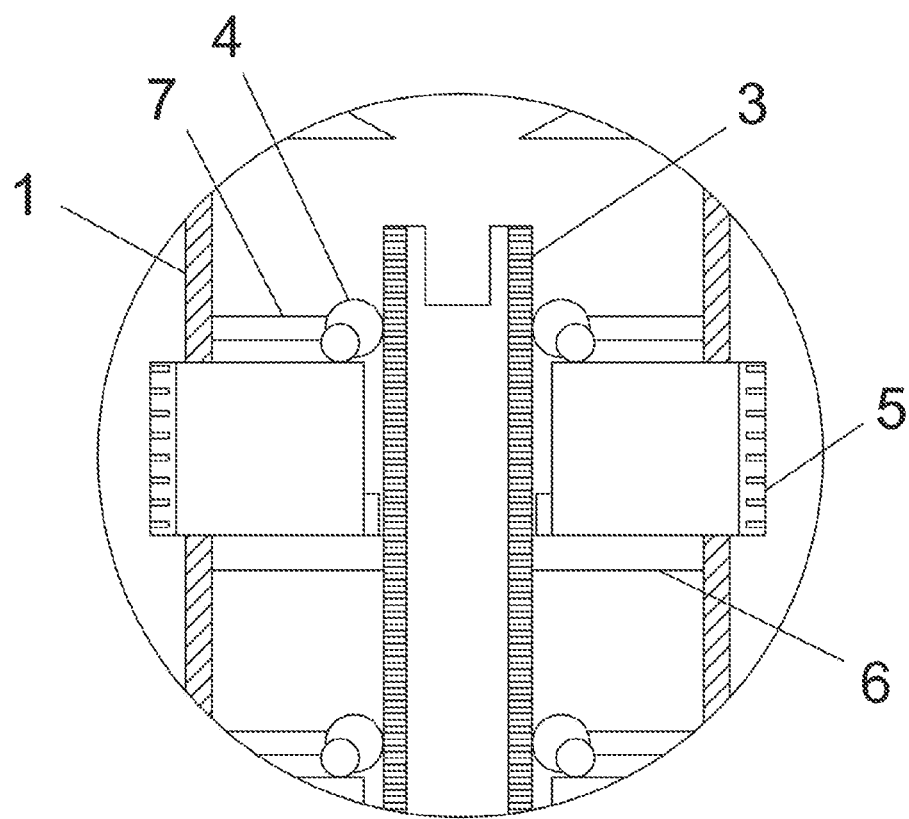
FIG. 2 is an enlarged view of A in FIG. 1.

in the drawings, 1: housing, 2: bottom cover, 3: central shaft, 4: transmission gear, 5: slip, 6: slip support, 7: gear strut, 8: stable base, 9: adjusting plate, 10: pressing plate, 11: lifting component, 12: snap ring, 13: locking block, 14: support spring, 31: locking groove, 32: rack, 41: gear, 42: transmission wheel, 43: connecting shaft, 51: slip body, 52: slip sheet, 53: transmission groove, 54: fixed gear, 81: lifting base, 91: adjusting support rod, 92: adjusting support plate, 93: connecting hole, 11a: inclined section, and 52a: convex surface.

DESCRIPTION OF EMBODIMENTS

The present invention is further described in detail below with reference to the embodiments and drawings.

To make objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. Based on the embodiments of the present invention, all other embodiments obtained by those of ordinary skill in the art without creative effort shall fall within the protection scope of the present invention. Therefore, the following detailed descriptions of embodiments of the present invention provided in the accompanying drawings are not intended to limit the scope of the present invention that claims protection, but merely to represent selected embodiments of the present invention.

EMBODIMENT

Referring to FIG. 1, an integrated multi-slip sidetracking setting device for an ultra-deep well comprises a housing 1, a bottom cover 2 and a setting device body. The setting device body is of a cylindrical structure with an upper part being an inclined plane, a surface of the setting device body is covered with the housing 1, the detachable bottom cover 2 covers the bottom of the setting device body, and a central shaft 3, a plurality of groups of slips 5, a stable base 8, an adjusting plate 9, a pressing plate 10 and a locking block 13 are arranged inside the setting device. The inclined plane on the upper part of the setting device body is used for tilting, so that the setting device is integrally fixed in a shaft through the slips.

Figure 4:
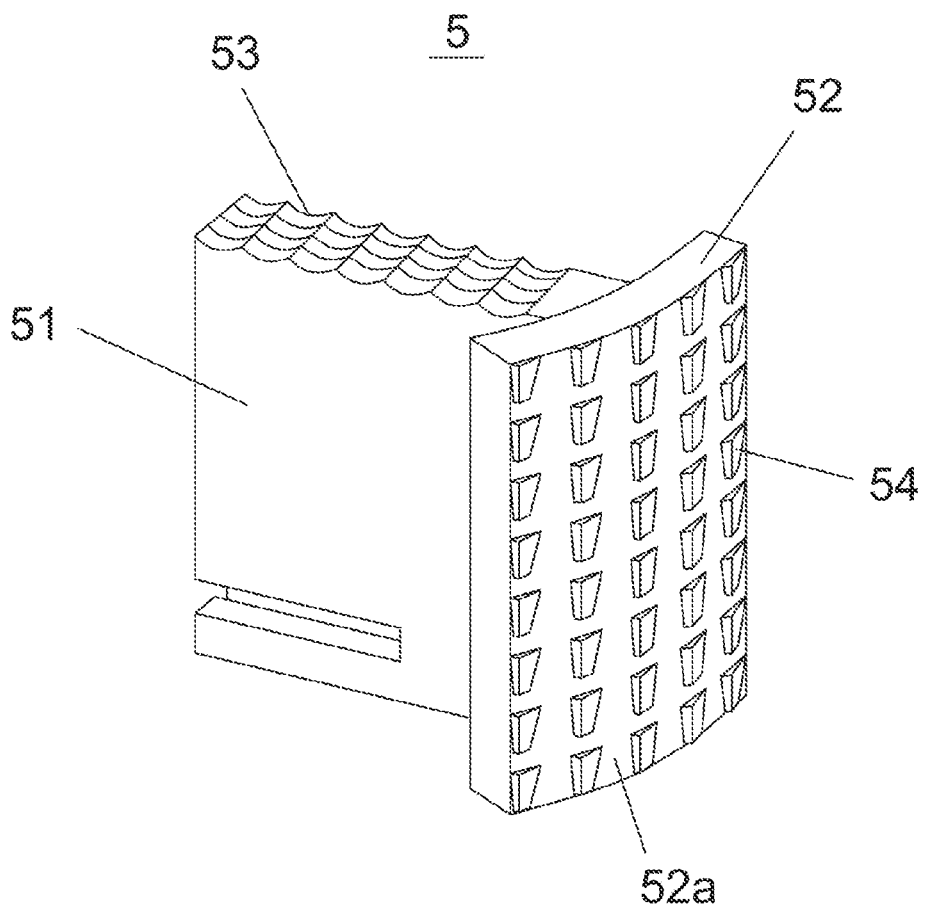
FIG. 4 is a schematic three-dimensional diagram of a slip according to the present invention.
Figure 5:
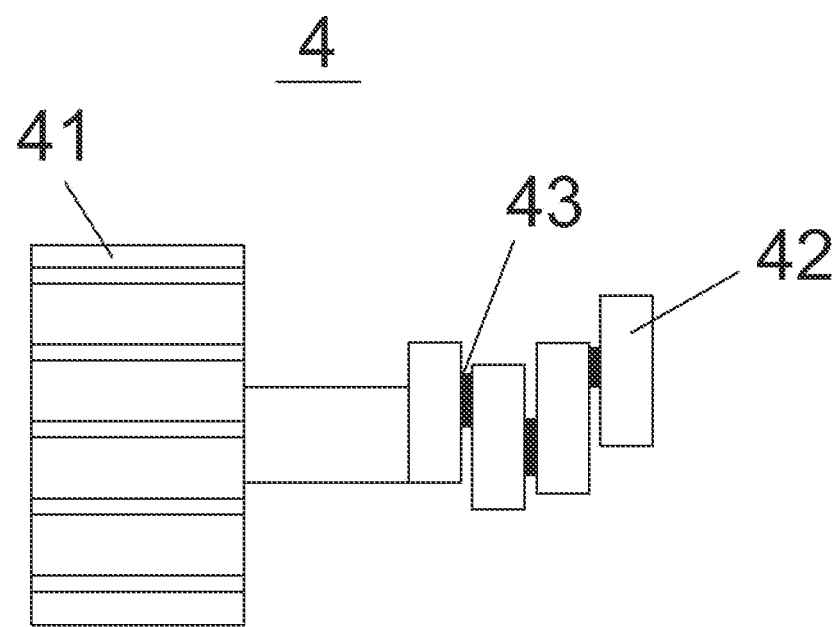
FIG. 5 is a schematic three-dimensional diagram of a transmission gear according to the present invention.
Figure 6:
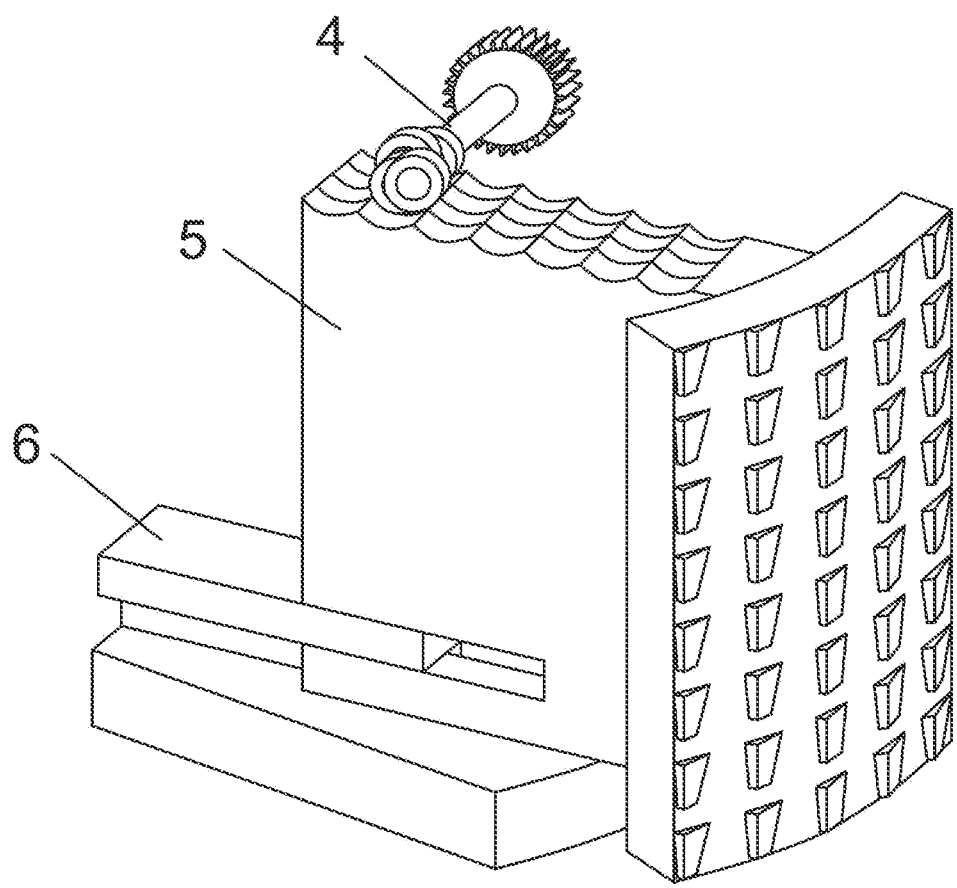
FIG. 6 is a schematic diagram of the structural distribution between a slip, a transmission gear and a slip support according to the present invention.

Referring to FIG. 4, one of the slips 5 comprises a slip body 51 and a slip sheet 52, the slip sheet 52 is an arc body, a radian of the slip sheet is the same as that of a front side surface of the housing 1 of the setting device, the slip body 51 is connected and arranged on an inner concave surface of the slip sheet 52, and a through hole with the same radian and shape as the slip sheet 52 is correspondingly arranged on the side surface of the housing 1 and used to allow the slip sheet 52 to pass through. The radian of the surface of the slip sheet 52 allows the slip sheet to be embedded in the housing 1 or to directly fill the through hole on the surface of the housing 1 for the slip sheet 52 to pass through, so that the setting device is not affected when the setting device is lowered into a well. When the setting device needs to be fixed, the slip sheet 52 can be pushed to contact the well wall to achieve the clamping and fixing. The number of the slips 5 may be arbitrarily set according to the fixing strength. This is not particularly limited herein.

Figure 7:
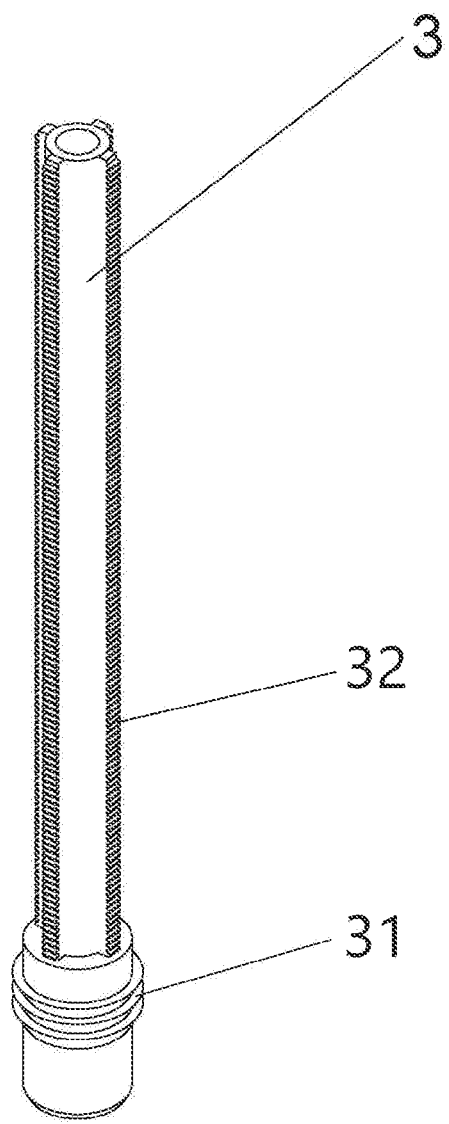
FIG. 7 is a schematic three-dimensional diagram of a central shaft according to the present invention.
Figure 8:
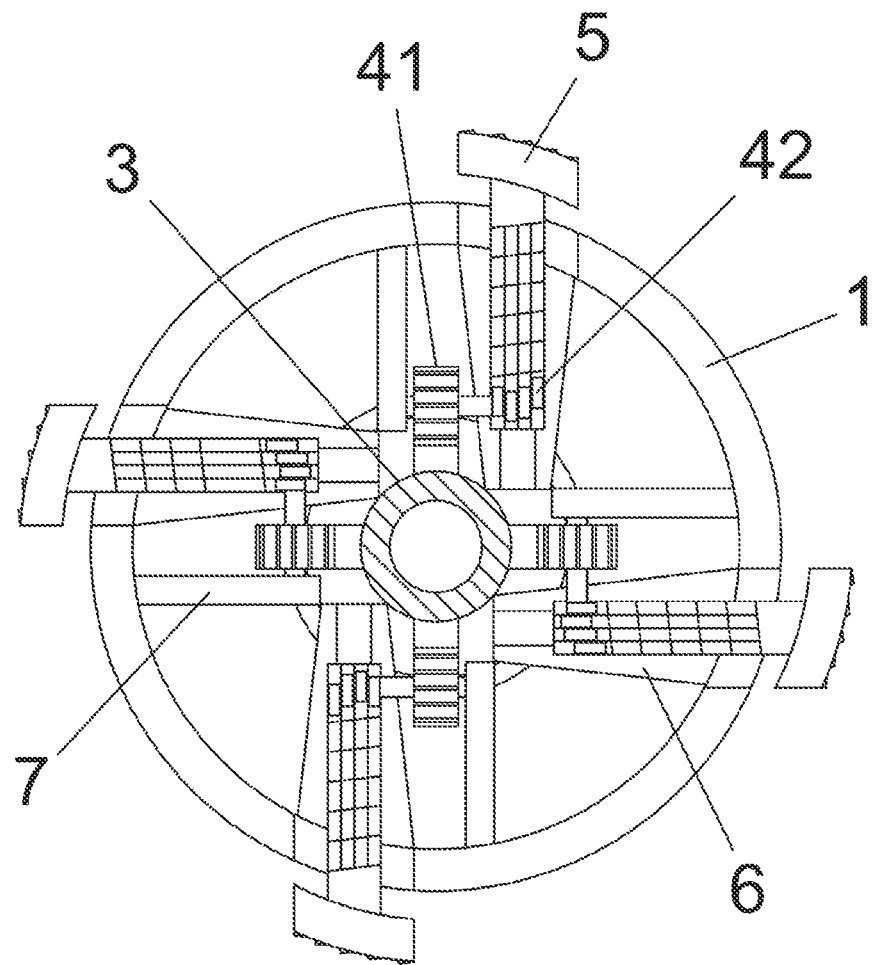
FIG. 8 is a top cross-sectional view of an overall structure of a setting device according to the present invention.

In this embodiment, the slip 5 can radially extend out of the side surface of the housing 1 of the setting device under the driving of a central shaft 3 coaxially arranged in the setting device, and when the central shaft 3 is fixed, the slip sheet 52 is positioned outside the housing 1, that is, the movement of the slip 5 is provided by the central shaft 3. As can be seen from FIG. 7, a plurality of groups of racks 32 are axially arranged on the surface of the central shaft 3, the racks 32 are in one-to-one correspondence with the slips 5 in number, the central shaft 3 can drive the slip 5 to move in the downward process, and the power for the downward movement of the central shaft 3 may come from a pipe column that penetrates through the middle of the housing 1 through the inclined plane in FIG. 1 and extends into the setting device to contact the central shaft 3. This pipe column extending into the setting device belongs to the prior art and is not described herein. The specific structure of the central shaft 3 pushing the slip 5 to move is as follows:

referring to FIGS. 2, 5, 6 and 8, the central shaft 3 is connected to the slip 5 through a transmission gear 4, wherein the transmission gear 4 comprises a gear 41, transmission wheels 42 and connecting shafts 43, the gear 41 is supported by a gear strut 7 arranged inside the setting device, the gear 41 is engaged with the rack 32 and can be driven by the rack 32 to rotate around the axis, a connecting rod is arranged at the axis of the gear 41 and connected to a plurality of groups of transmission wheels 42, the transmission wheels 42 are connected side by side through side surfaces of the connecting shafts 43, and axes of the adjacent transmission wheels 42 are not overlapped, so that rotating shafts of all the transmission wheels 42 are parallel to a rotating shaft of the gear 41, and the transmission wheels 42 can contact the slip 5 and drive the slip 5 to move. When the central shaft 3 is pushed downward by the outer pipe column, the gear 41 is driven to rotate, and further the rotation is transmitted to the transmission wheels 42. In this embodiment, the moving direction of the slip body 51 is perpendicular to the rotating shafts of the transmission wheels 42; and it is clear that the slip support 6 cooperates with the slip 5 through a sliding groove, and the direction of the sliding groove is perpendicular to the rotating shafts of the transmission wheels 42, so that the slip 5 can move smoothly on the slip support 6. When the transmission wheels 42 rotate, the slip 5 is driven to move integrally to the outside of the housing 1 to contact the wall of the shaft, thereby realizing the function that the central shaft 3 moves to push the slip 5 to move outwards.

In addition, an eccentric connection structure is adopted between adjacent transmission wheels 42, different transmission wheels 42 sequentially contact the slips 5 in the rotating process, that is, the slips 5 are pushed to move by different transmission wheels 42 in turn. Compared with the conventional coaxial gear side-by-side design, the eccentric connection structure does not affect the continuous transmission of other transmission wheels 42 at the next time even if a certain transmission wheel 42 is stuck during the transmission process, which greatly reduces the problem that the slips 5 cannot be opened smoothly due to the fact that a transmission device is stuck in the working process of the ultra-deep well, and improves the robustness of the device.

In some embodiments, the slip body 51 is provided with transmission grooves 53 corresponding to the transmission wheels 42 in number, the transmission wheels 42 can contact the transmission grooves 53 to push the slip body 51 and slip sheet 52 to move along a direction perpendicular to a plane where the rotating shafts of the transmission wheels 42 are positioned, and all the transmission wheels 42 cannot contact the transmission grooves 53 simultaneously. The transmission grooves 53 can increase the contact effect between the slip body 51 and the transmission wheels 42, which avoids slippage, so that the slips 5 can be tightly clamped by the central shaft 3 at the position where the shaft wall contacts, and the overall fixing effect of the setting device is ensured.

In some embodiments, a plurality of groups of fixed teeth 54 are arranged at intervals on a convex surface 52*a* of the slip sheet 52 to create a roughened surface to increase the contact effect between the slip 5 and the shaft.

Figure 3:
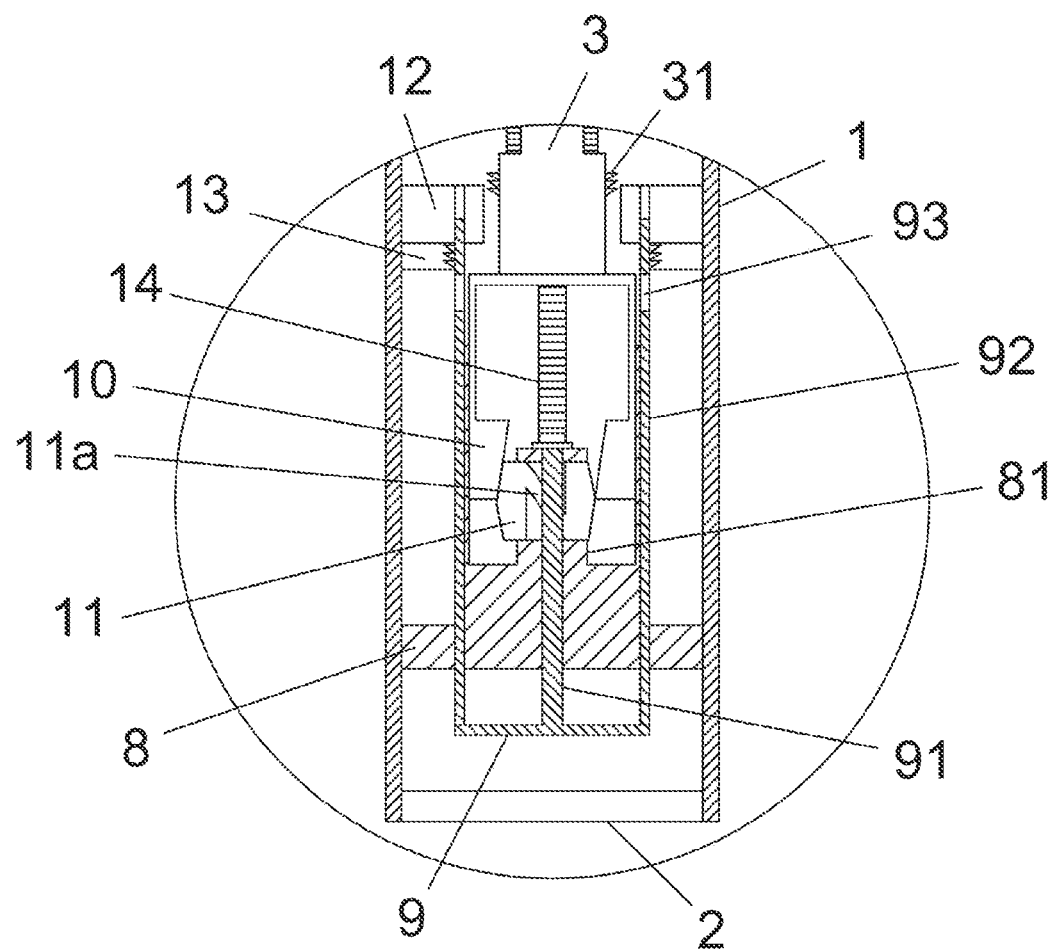
FIG. 3 is an enlarged view of B in FIG. 1.

It can be seen from the above that the central shaft 3 clamps the slips 5 on the shaft by moving downward. To ensure that the slips 5 are stably clamped, the central shaft 3 is required to be provided with a corresponding structure for locking, so that the entire setting device can maintain the clamped state. Therefore, a pressing plate 10 is provided below the central shaft 3 for support. The specific structure of the pressing plate is shown in FIG. 3:

the central shaft 3 is arranged above the pressing plate 10 and supported by the pressing plate 10, and the pressing plate 10 is supported by the stable base 8 below and can move up and down, so that the central shaft 3 and the pressing plate 10 can synchronously move up and down; and the adjusting plate 9 is arranged below the pressing plate 10, and when the central shaft 3 pushes the pressing plate 10 to move downward, the pressing plate 10 can push the adjusting plate 9 to move upward and allows the locking block 13 to cooperate with a locking groove 31 on a surface of the central shaft 3 to fix the central shaft 3. The basic function of this structure is as follows: the central shaft 3 moves downward to push the slips 5 to a position in contact with the shaft and then squeezes the pressing plate 10. The pressing plate 10 activates the corresponding structure to lock the central shaft 3. The specific composition of the corresponding structure is as follows:

referring to FIG. 3, in this embodiment, the stable base 8 is provided with a lifting base 81, a lifting component 11 capable of moving horizontally is arranged in the lifting base 81, the lifting component 11 can be pushed to move horizontally when the pressing plate 10 moves up and down, the lifting component 11 moving horizontally can drive the adjusting plate 9 to move up and down, the adjusting plate 9 comprises an adjusting support rod 91 and an adjusting support plate 92, the adjusting support rod 91 is arranged in the middle of the adjusting plate 9, the adjusting support plate 92 surrounds the adjusting support rod 91 and is arranged on the adjusting plate 9, the adjusting support rod 91 penetrates through the lifting base 81 and is clamped on a top surface of the lifting base 81, the adjusting support rod 91 further supports the pressing plate 10 through a support spring 14, and at least a part of inclined section 11*a* of the lifting component 11 penetrates through the adjusting support rod 91, so that when the lifting component 11 moves horizontally, the adjusting support rod 91 can move up and down along the inclined section 11*a*, and meanwhile the adjusting support plate 92 is driven to move synchronously.

The function of the lifting component 11 is to convert the downward force provided by the central shaft 3 into the power to drive the adjusting plate 9 upward as a whole. Therefore, it can be seen from FIG. 9 that the lifting component 11 has a structure in a shape similar to the capital English letter "N", and when the lifting component moves horizontally, a rod body passing through an inclined part in the middle of "N" has a tendency of being driven by the inclined part. In this embodiment, the structure passed by the inclined part in the middle of "N" is the adjusting support rod 91 on the adjusting plate 9, it can be seen that the adjusting support rod 91 is clamped by the lifting base 81 and cannot move downward and horizontally, and therefore, when the lifting component 11 with the "N"-shaped structure moves horizontally, the adjusting support rod 91 only has a displacement space lifted by the inclined section 11a with the "N"-shaped structure. In this embodiment, when the central shaft 3 moves downward from the basic position to the position where the slip 5 contacts and is fixed with the shaft, the adjusting support rod 91 is lifted by the lifting component 11, the entire adjusting plate 9 is lifted to the corresponding position as a whole, and the locking block 13 is released to clamp and fix the central shaft 3.

Figure 9:
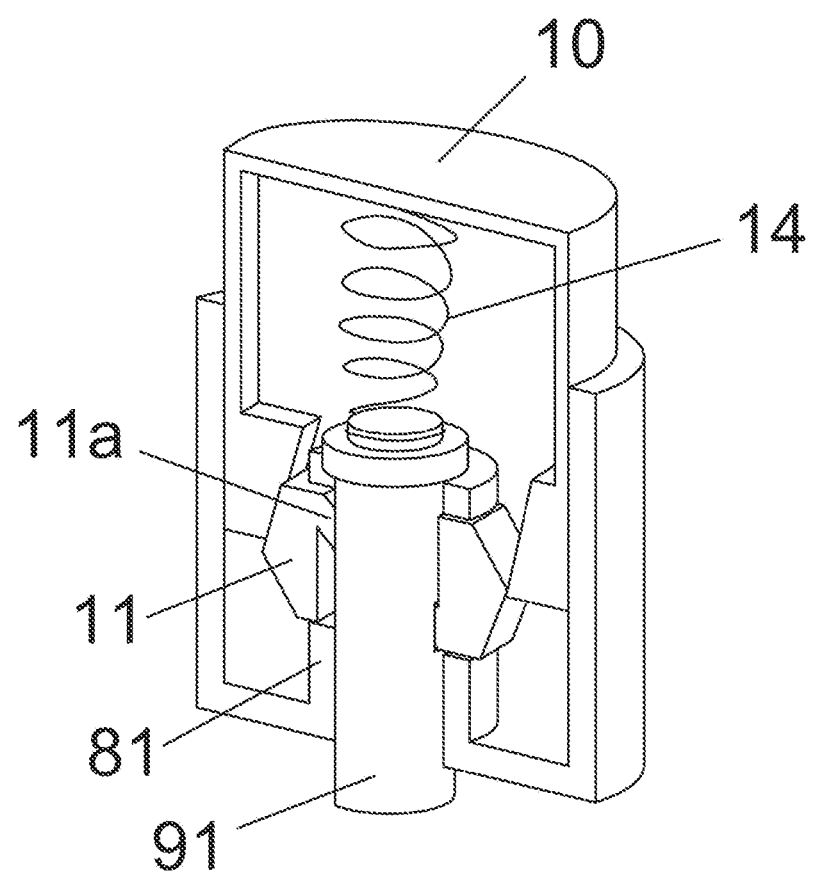
FIG. 9 is a schematic three-dimensional diagram of a cooperating structure of a pressing plate and a lifting component according to the present invention.

It can be seen from FIGS. 3 and 9 that the horizontal movement of the lifting component 11 is generated by the squeezing action of the pressing plate 10, that is, the pressing plate 10 squeezes the lifting component 11 downward to move horizontally, so as to raise the contact point between the adjusting support rod 91 and the lifting component 11 from a low position of the inclined section 11a of the "N"-shaped structure to a high position, so that the adjusting support rod 91 is correspondingly lifted by the inclined section 11a with the "N"-shaped structure, thereby achieving the effect of pressing the pressing plate 10 downward and lifting up the adjusting support rod 91. In this embodiment, the vertical sections on two sides of the "N"-shaped structure of the lifting component 11 also have partial inclined surfaces, and the pressing plate 10 also has a part of an inclined surface cooperating with the inclined surfaces on the vertical sections on two sides of the "N"-shaped structure, which can effectively improve the squeezing effect of the pressing plate 10 on the lifting component 11.

The function of the support spring 14 is to support the pressing plate 10 in a natural state to prevent the pressing plate from moving downward due to its own weight. It is clear that the support force of the support spring 14 needs to be greater than the sum of the weights of the pressing plate 10 and the central shaft 3, and the lifting component 11 also needs to maintain the position unchanged when only the pressing plate 10 and the central shaft 3 are supported.

When the entire adjusting plate 9 is lifted up as the pressing plate 10 moves downward, the adjusting support plate 92 arranged around the adjusting support rod 91 on the adjusting plate 9 will also move synchronously. It can be seen from FIG. 3 that the adjusting support plate 92 needs to penetrate through the lifting base 81, which can be a continuous surrounding like a cylinder wall or can be provided by a plurality of adjusting support plates 92 arranged at intervals, and no matter which structure is adopted, before the central shaft 3 enters the fixed position, the adjusting support plate 92 can generate a blocking effect on the locking block 13 to prevent the locking block from contacting the central shaft 3 in advance to prevent the central shaft 3 from moving downward.

The adjusting support plate 92 is further provided with a connecting hole 93. When the central shaft 3 moves to a to-be-fixed position, the connecting hole 93 will move upward synchronously with the adjusting plate 9 to the locking block 13, just allowing the locking block 13 to penetrate through the connecting hole 93. Therefore, the cooperation between the locking block and the locking groove 31 is realized, and the central shaft 3 is fixed. In this case, the slips 5 closely contact the shaft, and after the internal structure of the housing 1 is fixed through the steps here, the entire setting device is finally firmly fixed inside the shaft, which facilitates the smooth progress of sidetracking and tilting.

In some embodiments, an inner side wall of the housing 1 is also provided with a snap ring 12 that allows the central shaft 3 to pass through smoothly, the locking block 13 can move horizontally on the snap ring 12, and the middle aperture of the snap ring 12 is greater than the maximum diameter of the central shaft 3, thereby allowing the central shaft 3 to move downward. The main function of the snap ring 12 is to support the locking block 13 and allow the locking block to move on the snap ring 12, so that the structure between the locking block 13 and the snap ring 12 can be connected by a sliding groove matching structure similar to that between the slip 5 and the slip support 6.

When the central shaft 3 enters the to-be-fixed position, the locking block 13 needs to be able to move towards the locking groove 31 and be positioned in cooperation therewith, therefore, the moving mode of the locking block 13 includes but is not limited to motor support drive, motor chute drive, magnetic adsorption drive and traveling crane drive. In this embodiment, the magnetic adsorption drive is adopted, that is, the locking block 13 and the locking groove 31 are both made of magnetic materials, the locking block 13 moves towards the locking groove 31 through the magnetic adsorption effect to lock the position of the central shaft, and the types of the magnets include but are not limited to natural magnets and electromagnets, which can reduce the complexity of the device and improve the robustness of the device.

In conclusion, the specific working process of the present invention is as follows:

the entire setting device is sent to a preset position of a shaft according to the state in FIG. 1, a pipe column penetrates into the setting device from a through hole of an inclined plane and contacts a central shaft 3, the central shaft 3 is pressed to move downward, and the downward movement of the central shaft 3 pushes a slip 5 to move towards the outside of a housing 1 until the slip contacts the wall of the shaft and is clamped. In addition, the pressing plate 10 below the central shaft 3 is also pressed downward, the lifting component 11 is squeezed by the pressing plate 10, the adjusting support rod 91 is further squeezed upward, after the adjusting support rod 91 moves upward, the adjusting support plate 92 and the connecting hole 93 are driven to move upward synchronously with the adjusting support rod 91, and when the slip 51 contacts the wall of the shaft and is clamped, the position of the central shaft 3 just enables the locking block 13 to penetrate through the connecting hole 93 to cooperate with and be clamped with the locking groove 31 on the central shaft 3, so that the setting of the entire setting device is realized, and then the prefixed device such as the pipe column can be removed, and the setting device is put into use.

It should be noted that the setting device can adapt to shafts with different specifications by replacing slips 5 with slip bodies 51 in different sizes, and the number of slips 5 can be set according to the fixed strength. Since the connection between the locking block and the central shaft in the present invention is fixed by magnetic adsorption, the complexity of the internal structure of this tool is further reduced, and a larger number of slips can be accommodated. Compared with existing similar devices, the opening method of this tool is more stable and smooth, so that the setting force is increased, thereby reducing the risk of slippage of the setting device used for window sidetracking during the window sidetracking process.

In the description of the present invention, it should be noted that directions or positional relationships indicated by terms such as "upper", "lower", "front", "rear", "left", "right", "top", "bottom", "in", "out" are those shown based on the accompanying drawings, are merely intended to facilitate and simplify description rather than indicate or imply that the indicated device or element must have a specific direction and be structured and operated according to the specific direction, and should not be construed as limiting the present invention.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. An integrated multi-slip sidetracking setting device for an ultra-deep well, comprising: a housing and a bottom cover, wherein the setting device is of a cylindrical structure with an upper part being an inclined plane, a surface of the setting device is covered with the housing, the bottom cover is detachable and covers the bottom of the setting device, and a central shaft, a plurality of groups of slips, a stable base, an adjusting plate, a pressing plate and a locking block are arranged inside the setting device, wherein one of the slips comprises a slip body and a slip sheet, the slip sheet is an arc body, a radian of the slip sheet is the same as that of a front side surface of the housing of the setting device, and the slip body is connected and arranged on an inner concave surface of the slip sheet;

the central shaft is arranged above the pressing plate and supported by the pressing plate, and the pressing plate is supported by the stable base below and can move up and down, so that the central shaft and the pressing plate can synchronously move up and down;

the slip can radially extend out of the side surface of the housing of the setting device under the driving of the central shaft coaxially arranged in the setting device, a through hole with the same radian and shape as the slip sheet is correspondingly arranged on the side surface of the housing and used to allow the slip sheet to pass through, and when the central shaft is fixed, the slip sheet is positioned outside the housing;

the adjusting plate is arranged below the pressing plate, and when the central shaft pushes the pressing plate to move downward, the pressing plate can push the adjusting plate to move upward and allows the locking block to cooperate with a locking groove on a surface of the central shaft to fix the central shaft;

the stable base is provided with a lifting base, a lifting component capable of moving horizontally is arranged in the lifting base, the lifting component can be pushed to move horizontally when the pressing plate moves up and down, and the lifting component moving horizontally can drive the adjusting plate to move up and down;

the adjusting plate comprises an adjusting support rod and an adjusting support plate, the adjusting support rod is arranged in the middle of the adjusting plate, the adjusting support plate surrounds the adjusting support rod and is arranged on the adjusting plate, the adjusting support rod penetrates through the lifting base and is clamped on a top surface of the lifting base, the adjusting support rod further supports the pressing plate through a support spring, and at least a part of inclined section of the lifting component penetrates through the adjusting support rod, so that when the lifting component moves horizontally, the adjusting support rod can move up and down along the inclined section, and meanwhile the adjusting support plate is driven to move synchronously; and the adjusting support plate is further provided with a connecting hole, and when the central shaft moves to a to-be-fixed position, the connecting hole moves to the locking block, and the locking block is allowed to penetrate through the connecting hole to cooperate with the locking groove to fix the central shaft;

the surface of the central shaft is provided with racks in one-to-one correspondence with the slips in number and position along an axial direction;

the central shaft is connected to the slip through a transmission gear, the transmission gear comprises a gear, transmission wheels and connecting shafts, the gear is supported by a gear strut arranged inside the setting device and engaged with the rack, and can be driven by the rack to rotate around the axis, a connecting rod is arranged at the axis of the gear and connected to a plurality of groups of transmission wheels, the transmission wheels are connected side by side through side surfaces of the connecting shafts, and axes of the adjacent transmission wheels are not overlapped, so that rotating shafts of all the transmission wheels are parallel to a rotating shaft of the gear, and the transmission wheels can contact the slip and drive the slip to move;

the slip body is provided with transmission grooves corresponding to the transmission wheels in number, the transmission wheels can contact the transmission grooves to push the slip body and slip sheet to move along a direction perpendicular to a plane where the rotating shafts of the transmission wheels are positioned, and all the transmission wheels cannot contact the transmission grooves simultaneously;

an inner side wall of the housing is also provided with a snap ring that allows the central shaft to pass through smoothly, and the locking block can move horizontally on the snap ring; and the locking block and the locking groove are both made of magnetic materials.

2. The integrated multi-slip sidetracking setting device for an ultra-deep well according to claim 1, wherein the slip is arranged on a slip support, and the slip support is arranged inside the housing and cooperates with the slip through a sliding groove to allow the slip to move while supporting the slip.

3. The integrated multi-slip sidetracking setting device for an ultra-deep well according to claim 1, wherein a plurality of groups of fixed teeth are arranged at intervals on a convex surface of the slip sheet.

* * * * *